United States Patent Office 3,644,460
Patented Feb. 22, 1972

3,644,460
PREPARATION OF AROMATIC ISOCYANATES
Eric Smith, Madison, Conn., assignor to Olin
Mathieson Chemical Corporation
No Drawing. Filed Nov. 21, 1968, Ser. No. 777,866
Int. Cl. C07c 119/04
U.S. Cl. 260—453 P                                   19 Claims

ABSTRACT OF THE DISCLOSURE

The process for preparing an organic iscyanate by reacting an organic nitro compound with carbon monoxide in the presence of a catalyst system comprising (a) a halide of a noble metal and (b) an aryl halo compound of a metal selected from Groups IIb, IIIb and IVb of the Periodic Table or a complex of (a) and (b). Preferred aryl halo compounds include diaryl lead dihalides, diaryl germanium dihalides, aryl boron dihalides and aryl mercuric halides. The noble metal halide is preferably a halide of palladium, rhodium, iridium, rhenium, platinum, and mixtures thereof. The catalyst system may also include molybdenum trioxide or another metal oxide.

---

This invention relates to an improved process for a preparation of organic isocyanates from organic nitro compounds in which a catalyst system comprising (a) a halide of a noble metal and (b) an aryl halo compound of a metal of Groups IIb, IIIb, or IVb or a complex of (a) and (b) is employed.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Patent No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Patent No. 672,405 entitled "Process For The Preparation Of Organic Isocyanates" describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of:

(A) at least one aryl halo compound of the formula:

$$R_mMX_n$$

wherein R is aryl of from 6 to 12 carbon atoms, M is a metal selected from Groups IIb, IIIb, and IVb of the Periodic Table having a valence of $v$, X is a halogen selected from the group consisting of chlorine, bromine and iodine, $m$ is an integer of from 1 to 2 inclusive, $n$ is an integer of from 1 to 2 inclusive, and $v$ is equal to $m$ plus $n$, and (B) At least one noble metal halide, or
(C) A complex of A and B.

Any organic nitro compound capable of being converted to an organic isocyanate may be employed as a reactant. Generally, aromatic, cycloaliphatic, and aliphatic mono- or poly-nitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes (a) Nitrocyclobutane
(b) Nitrocyclopentane
(c) Nitrocyclohexane
(d) Ninitrocyclohexanes
(e) Bis(nitrocyclohexyl)methanes (III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes (o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitro-alkyl, alkyl, alkenyl, alkoxy, aryloxy, halogen, alkylthio, arylthio, carboxyalkyl, cyano, isocyanato, and the like, and employed as reactants in the novel process of this invention. Specifiic examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) 1,4-dinitrocyclohexane
(71) Bis(p-nitrocyclohexyl)methane
(72) 1-nitro-n-hexane
(73) 2,2-dimethyl-1-nitrobutane
(74) 1,6-dinitro-n-hexane
(75) 1,4-bis(nitromethyl)cyclohexane
(76) 3,3'-dimethoxy-4,4'-dinitro-biphenyl
(77) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyananto-4-nitrotoluene, may also be employed as a reactant.

The process of this invention is particularly effective in the conversion of aromatic nitro compounds to organic isocyanates. As used herein, the term "aromatic nitro compound" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and a substituted organic nitro compounds contain between 1 and about 20 carbon atoms, and preferably between about 6 and about 14 carbon atoms.

The catalyst system of this invention is comprised of at least one aryl halo compound and at least one noble metal halide or a complex of these two materials. The aryl halo compound is one having the formula:

$$R_mMX_n$$

wherein R is aryl of from 6 to 12 inclusive carbon atoms, M is a metal selected from Groups IIb, IIIb, and IVb of the Periodic Table having a valence of $v$, X is halogen selected from the group consisting of chlorine, bromine and iodine, $m$ and $n$ are each an independently selected integer of from 1 to 2 inclusive, and $v$ is equal to $m$ plus $n$. The Periodic Table referred to herein is the Periodic Table shown on page 122 of Inorganic Chemistry by Moeller, John Wiley and Sons, Inc. 1952.

Examples of aryl halo compounds useful in the catalyst system of this invention include:

Group IIb

Phenyl zinc chloride
Tolyl zinc bromide
Tolyl zinc iodide
Xylyl zinc iodide
Phenyl zinc bromide Phenyl cadmium chloride
Phenyl cadmium bromide
Tolyl cadmium iodide
Xylyl cadmium bromide Phenyl mercuric chloride
Tolyl mercuric chloride
Tolyl mercuric bromide
Xylyl mercuric iodide

Group IIIb

Phenyl boron dichloride
Phenyl boron dibromide
Diphenyl boron chloride
Tolyl boron diiodide
Xylyl boron dibromide
Ditolyl boron bromide
Ditolyl boron chloride Phenyl aluminum dichloride
Phenyl aluminum diiodide
Diphenyl aluminum bromide
Diphenyl aluminum iodide
Ditolyl aluminum chloride
Ditolyl aluminum iodide
Ditolyl aluminum bromide
Xylyl aluminum dichloride
Dixylyl aluminum bromide Phenyl gallium dichloride
Phenyl gallium diiodide
Ditolyl gallium chloride
Ditolyl gallium bromide
Xylyl gallium dichloride
Dixylyl gallium dibromide Phenyl indium dichloride
Phenyl indium dibromide
Diphenyl indium bromide
Ditolyl indium bromide
Tolyl indium diiodide
Xylyl indium dichloride Phenyl thallium dichloride
Phenyl thallium diiodide
Phenyl thallium dibromide
Diphenyl thallium iodide
Tolyl thallium dichloride
Ditolyl thallium iodide
Xylyl thallium dibromide
Dixylyl thallium chloride

Group IVb

Diphenyl dichloro silane
Diphenyl dibromo silane
Diphenyl diiodo silane
Ditolyl dichloro silane
Dixylyl diiodo silane Phenyl germanium bromide
Xylyl germanium chloride
Diphenyl germanium dichloride
Diphenyl germanium dibromide
Diphenyl germanium diiodide
Ditolyl germanium dichloride
Diphenyl germanium dibromide Phenyl tin chloride
Tolyl tin chloride
Xylyl tin bromide
Xylyl tin iodide
Diphenyl tin dichloride
Diphenyl tin dibromide
Diphenyl tin diiodide
Ditolyl tin dibromide
Ditolyl tin diiodide
Dixylyl tin dichloride
Dixylyl tin diiodide Phenyl lead chloride
Phenyl lead bromide
Phenyl lead iodide
Tolyl lead bromide
Xylyl lead chloride
Diphenyl lead dichloride
Diphenyl lead dibromide
Diphenyl lead diiodide
Ditolyl lead dichloride
Ditolyl lead diiodide
Dixylyl lead dichloride
Dixylyl lead dibromide The aryl group of the aryl halo compounds useful in the catalyst system of this invention may be substituted with one or more other groups such as halogen including fluorine, chlorine, bromine, iodine, alkyl and alkoxy having 1 to 8 carbon atoms, including methyl to octyl; aryloxy having between 6 to 12 carbon atoms, such as phenyl, cresyl, naphthyl, xylyl and the like and it is to be understood that the term "aryl halo compound" as used herein refers to compounds in which the aryl group may be either unsubstituted or substituted.

In the process of this invention certain selected aryl halo compounds of the formula:

$$R_mMX_n$$

wherein R, M, X, $m$, and $n$ have the same meaning as previously described, have been found to be particularly efficacious when used with the noble metal halides. One such group of aryl halo compounds includes compounds where M is silicon, tin, lead, germanium or mercury. Especially useful aryl halo compounds falling within this classification include diaryl tin dihalides, such as ditolyl tin dichloride; diaryl lead dihalides such as diphenyl lead dichloride; diaryl germanium dihalides, such as diphenyl germanium dichloride; aryl boron dihalides, such as phenyl boron dichloride and aryl mercuric halides, such as phenyl mercuric chloride.

The second component of the catalyst system is at least one halide of a noble metal. Noble metals include ruthenium, rhenium, rhodium, palladium, osmium, iridium, platinum, silver and gold. The halides of palladium, rhodium, platinum, iridium, rhenium and mixtures thereof are particularly preferred noble metal halides. Typical examples of suitable halides include palladous bromide, palladous chloride, palladous fluoride, palladous iodide, rhodium tribromide, rhodium trichloride, rhodium trifluoride, rhodium triiodide; ruthenium dichloride, ruthenium trichloride, ruthenium tetrachloride; osmium dichloride, osmium trichloride, osmium tetrachloride; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridium  iodide, iridium tetraiodide, and mixtures thereof. An especially useful group of noble metal halides includes palladous chloride, rhodium trichloride, iridium trichloride, platinic chloride, and mixtures thereof. Oxides of the noble metals may also be employed and the term "halide of a metal" is used throughout the description and claims is intended to include the above mentioned metal halides as well as the corresponding oxides, such as palladium oxide, rhodium oxide, platinum oxide, etc., and the like.

The use of the aryl halo compound of a metal selected from Groups IIb, IIIb, and IVb of the Periodic Table in catalytic combination with the noble metal halide is generally accomplished by adding the aryl halo compound and the noble metal halide separately to the reaction system or, if desired, they may be premixed prior to adding the organic nitro compound. However, it has been determined that complexes, which can be formed by reacting the noble metal halide and the aryl halo compound also, can be utilized very effectively as the catalyst system in the conversion of the nitro compounds to isocyanates with carbon monoxide. When it is desired to utilize complexes of the aryl halo compound and noble metal halide, the two materials may be first reacted in a suitable solvent such as monochlorobenzene, ortho-dichlorobenzene, dioxane or tetrahydrofuran to form an organic metal halide complex, which is then isolated as a solid and added to the reaction mixture. For example, one mole of diphenyl lead dichloride may be reacted with one mole of palladous chloride in anhydrous organic media, such as ortho dichlorobenzene, under refluxing conditions for five hours or more. After cooling the reaction mixture to room temperature, orange crystals of the complex can be recovered by filtration. Thus, it is to be understood that in the practice of this invention the use of the aryl halo compound in combination with the use of the noble metal halide may involve either the separate addition of each of the reaction system or, if desired, the prior formation of a complex of the two materials and subsequent use thereof in the reaction.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of aryl halo compound of a metal selected from Groups IIb, IIIb or IVb to the noble metal halide is generally between about 0.01 and about 10 and preferably between about 0.2 and about 5 but greater or lesser ratio may be employed if desired.

The process of this invention operates effectively in the absence of a solvent, but improved overall yields of the organic isocyanates can be obtained when a solvent which is chemically inert to the components of the reaction system is employed. Suitable solvents include aliphatic cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as liquid sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent,, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space iof the reactor is sufficient to maintain the desired pressure as well as provided reactant for the process, as the reaction progresses. If desired, additional carbon monoxide can be fed to the reactor either intermittently or continuously as the reaction progresses. The reaction is believed to progress in accordance with the following equation:

(I) 

where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the techniques of this invention are suitable for use in preparing polyurethane compositions such as foams, coatings, fibers and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains an aryl halo compound of a metal selected from Groups IIb, IIIb and IVb and a noble metal halide but also contains a third component comprised of certain metal oxides. Oxides suitable as a third component of the catalyst system include at least one oxide of an element selected from the group consisting of vanadium, molybdenum, tungsten, niobium, chromium, tantalum, and iron, as described in co-pending application Ser. No. 619,158, filed Feb. 28, 1967, for Process, by Schnabel et al. and Ser. No. 757,105 filed Sept. 3, 1968, for Noble Metal Catalyst System Containing Oxide of Iron by Rao et al. These elements, with the exception of iron, are found in Groups Va and VIa of the Periodic Table. Suitable oxides of this type include chromic oxide ($Cr_2O_3$), chromium dioxide ($CrO_2$), chromous oxide (CrO); molybdenum dioxide ($MoO_2$), molybdenum trioxide ($MoO_3$) and molybdenum sesquioxide ($Mo_2O_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), ferrous oxide (FeO) and ferric oxide ($Fe_2O_3$). Mixtures of two or more of these oxides may be employed as one component of the catalyst mixture. The proportion of the third component of the catalyst system, when one is employed, is generally equivalent to a weight ratio of the noble metal halide to the metal oxide in the catalyst system generally in the range between about 0.001:1 and about 25:1, and preferably in the range between about 0.005:1 and about 5:1.

Table 1. Other pertinent details are also given in Table 1 which follows:

TABLE 1

| Example | Catalyst Noble metal halide | Percent by weight [1] | Aryl halo compound | Moles of aryl halo compound/mole noble metal halide | Conversion | Percent yield TDI [2] | Total product [3] |
|---|---|---|---|---|---|---|---|
| II | PdCl₂ | 8 | Diphenyl dichlorosilane | 1:1 | 94 | 1 | 17 |
| III | PdCl₂ | 8 | Diphenyl lead dichloride | 2:1 | 35 | 23 | 33 |
| IV | RhCl₃ | 8 | ___do___ | 3:1 | 12 | 32 | 76 |
| V | RhCl₃ | 8 | ___do___ | 3:1 | 44 | 18 | 48 |
| VI | PdCl₂ | 8 | Diphenyl germanium dichloride | 1:1 | 29 | 0 | 35 |
| VII | PdCl₂ | 8 | ___do___ | 1:1 | 17 | 0 | 36 |
| VIII | RhCl₃ | 8 | ___do___ | 2:1 | 31 | 0 | 24 |
| IX | RhCl₃ | 8 | ___do___ | 1:1 | 29 | 5 | 35 |
| X | RhCl₃ | 8 | ___do___ | 1:1 | 41 | 1 | 34 |
| XI | RhCl₃ | 8 | ___do___ | 0.5:1 | 71 | 6 | 51 |
| XII | RhCl₃ | 8 | ___do___ | 0.5:1 | 68 | 6 | 53 |
| XIII | PdCl₂ | 8 | Phenyl boron dichloride | 1:1 | 39 | 3 | 24 |
| XIV | PdCl₂ | 8 | Phenyl mercuric chloride | 1:1 | 24 | 0 | 12 |
| XV | PdCl₂ | 8 | ___do___ | 1:1 | 42 | 1 | 24 |
| XVI | RhCl₃ | 8 | Phenyl boron dichloride | 3:1 | 52 | 3 | 26 |
| XVII | RhCl₃ | 8 | ___do___ | 3:1 | 56 | 1 | 4 |

[1] Based on weight of 2,4-dinitrotoluene employed which was 5 grams in all examples.
[2] 2,4-toluene diisocyanate.
[3] Total isocyanate product, including monoisocyanato-mononitro compounds.

The following examples are presented to describe the invention more fully without any intention of being limited thereby. All parts and percentages are by weight unless otherwise specified.

EXAMPLE I

In this example, 2,4-dinitrotoluene (5.0 g.), palladous dichloride (0.4 g., $2.26 \times 10^{-3}$ moles) and diphenyl lead dichloride ($5.52 \times 10^{-3}$ moles) were charged to a clean, 100 ml. stainless steel autoclave (316 grade) together with ortho-dichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The weight percentages of 2,4-dinitrotoluene, 2,4-toluene diisocyanate, 2-isocyanato-4-nitrotoluene and 4-isocyanato-2-nitrotoluene in the filtrate were determined by vapor phase chromatography. The conversion of 2,4-dinitrotoluene was calculated to be 42 percent. The yield of 2,4-toluene diisocyanate and the combined yield of mononitrotolyl isocyanates were calculated and then corrected for the amount of 2,4-dinitrotoluene which was recovered. The yield of toluene diisocyanate was 24 percent and the total yield of isocyanate products was 34 percent.

EXAMPLES II–XII

The procedure of Example I was repeated except that the catalyst system employed was varied as shown in

Comparative Examples A to F

In these examples, the procedure employed in Example I was employed with the exception that the catalyst system comprised a noble metal compound and a Lewis acid. In Example A, nitrobenzene (6.0 g.), palladic oxide, $PdO_2$ (0.18 g.), and antimony trichloride (0.36 g.) were charged to a clean, 100 ml. stainless steel autoclave (316 grade) together with 5 ml. of chlorobenzene. At the conclusion of the reaction, the reaction mixture was worked up by the same procedure as in Example I. Analysis of the filtrate obtained from the reaction mixture indicated that no phenyl isocyanate had been formed.

In Examples B through F, the procedure of Example I was repeated with the exception that different catalyst systems, comprising a noble metal compound and a Lewis acid, were employed. The proportions, catalyst, pressure range, percent conversion and percent corrected yield of phenyl isocyanate are set forth in Table 2, which follows:

TABLE 2

| Example | Catalyst (percent) [1] | Catalyst (percent) [2] | Pressure range (p.s.i.g.) | Conversion (percent) | Yield (percent) |
|---|---|---|---|---|---|
| B | PdCl₂ | SbCl₃ | 1,490–2,100 | ND | 0 |
| C | RhCl₃ | SbCl₃ | 1,350–1,920 | ND | 0 |
| D | PdCl₂ | SbF₃ | 1,400–2,000 | ND | 0 |
| E | PdCl₂ | AsCl₃ | 1,190–1,700 | ND | 0 |
| F | RhCl₃ | AsCl₃ | 1,270–1,800 | 6.5 | 0 |

[1] 1 percent based on the weight of the nitrobenzene charged to reactor.
[2] 6 percent by weight based on the weight of the nitrobenzene charged to the reactor.
ND=Not determined.

These comparative examples demonstrate that when Lewis acids such as antimony trichloride, antimony trifluoride and arsenic trichloride are used in combination with noble metal compounds as a catalyst system in the reaction of nitrobenzene with carbon monoxide, there is little or no formation of phenyl isocyanate.

Comparative Examples G–I

In these examples, the procedure employed was the same as Example I with the exception that the catalyst system comprised of a noble metal halide and a Lewis acid which was also an aryl halo compound, was employed.

Pertinent data which relates to these examples is shown in Table 3 which follows:

(a) diphenyl lead dichloride
(b) diphenyl dichlorosilane

TABLE 3

| Example | Catalyst Noble metal halide | Percent by weight [1] | Aryl halo compound | Moles of Aryl halo compound/mole noble metal halide | Conversion | Percent yield TDI [2] | Total product [3] |
|---|---|---|---|---|---|---|---|
| G | PdCl$_2$ | 8 | Phenyl tin trichloride | 2:1 | ND | 0 | 0 |
| H | PdCl$_2$ | 8 | Triphenyl tin chloride | 1:1 | ND | 0 | 0 |
| I | PdCl$_2$ | 8 | Triphenyl lead chloride | 1:1 | ND | 0 | 0 |

[1] Based on weight of 2,4-dinitrotoluene employed which was 5 grams in all examples.
[2] 2,4-toluene diisocyanate.
[3] Total isocyanate product, including monoisocyanate-mononitro compounds.
ND=Not determined.

The results obtained in the example show that when an aryl halo compound having more than two halo groups or two aryl groups attached to the metal atom is utilized in the catalyst system, no more than a trace of isocyanate is formed.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalyst system selected from the group consisting of
(I) a mixture of
  (A) an aryl halo compound of the formula:

$$R_mMX_n$$

wherein R is aryl of from 6 to 12 carbon atoms, M is a metal selected from the group consisting of zinc, cadmium, mercury, boron, aluminum, gallium, indium, thallium, silicon, germanium, tin and lead, said metal having a valence of $v$, X is a halogen selected from the group consisting of chlorine, bromine and iodine, $m$ is an integer of from 1 to 2 inclusive, $n$ is an integer of from 1 to 2 inclusive, and $v$ is equal to $m$ plus $n$, and
  (B) a noble compound selected from the group consisting of noble metal halides and noble oxides, and
(II) a complex of a compound of I-A and a noble metal compound of I-B,
(III) wherein the molar ratio of said aryl halo compound to the anion of said noble metal compound in said catalyst system is in the range between about 0.01:1 and about 10:1, and
(IV) wherein the noble metal of said noble metal compound is selected from the group consisting of palladium, rhodium, iridium, platinum, rhenium, ruthenium and mixtures thereof.

2. The process of claim 1 wherein the molar ratio of said aryl halo compound to the anion of said noble metal compound is in the range between about 0.2:1 and about 5:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a third component comprised of an oxide of a metal selected from the group consisting of vanadium, molybdenum, tungsten, niobium, chromium and tantalum.

7. The process of claim 1 wherein said metal of said aryl halo compound is selected from the group consisting of lead, silicon, germanium, boron and mercury.

8. The process of claim 7 wherein said aryl halo compound is selected from the group consisting of (a) diphenyl lead dichloride
(b) diphenyl dichlorosilane
(c) diphenyl germanium dichloride
(d) phenyl boron dichloride
(e) phenyl mercuric chloride 9. The process of claim 8 wherein said noble metal compound is selected from the group consisting of palladous chloride, rhodium trichloride, iridium trichloride, rhenium trichloride, platinum tetrachloride and mixtures thereof.

10. The process of claim 9 wherein said aromatic nitro compound is selected from the group consisting of nitrobenzene, dinitrotoluene and isocyanato-nitrotoluene.

11. The process of claim 10 wherein said catalyst system is a mixture of palladous chloride and diphenyl lead dichloride.

12. The process of claim 10 wherein said catalyst system is a mixture of palladous chloride and diphenyl germanium dichloride.

13. The process of claim 10 wherein said catalyst system is a mixture of rhodium trichloride and diphenyl germanium dichloride.

14. The process of claim 10 wherein said catalyst system is a mixture of rhodium trichloride and diphenyl lead dichloride.

15. The process of claim 10 wherein said catalyst system is a mixture of palladous chloride and phenyl boron dichloride.

16. The process of claim 10 wherein said catalyst system is palladous chloride and phenyl mercuric chloride.

17. The process of claim 10 wherein said catalyst system is palladous chloride and diphenyl dichloro silane.

18. The process of claim 10 wherein said catalyst system contains a third component comprised of an oxide of a metal selected from the group consisting of vanadium, molybdenum, tungsten, niobium, chromium and tantalum.

19. The process of claim 18 wherein said oxide of a metal is selected from the group consisting of chromic oxide ($Cr_2O_3$), chromium dioxide ($CrO_2$), and chromous oxide (CrO); molybenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), and mixtures thereof.

References Cited

UNITED STATES PATENTS 3,461,149  8/1969  Hardy et al. _____ 260—453

CHARLES B. PARKER, Primary Examiner

D. H. TORRENCE, Assistant Examiner

U.S. Cl. X.R.

252—429 A, 429 C, 43 C; 260—243 A, 429 R, 429.7, 429.9, 433, 435 R, 448 A, 448.2 R